UNITED STATES PATENT OFFICE.

MOSES SAMELSON, OF NEW YORK, N. Y.

MANUFACTURE OF LIQUID EXTRACTS OF COFFEE.

SPECIFICATION forming part of Letters Patent No. 358,300, dated February 22, 1887.

Application filed September 10, 1885. Serial No. 176,743. (No specimens.)

*To all whom it may concern:*

Be it known that I, MOSES SAMELSON, of the city, county, and State of New York, have invented a new and useful Improvement in the Manufacture of Liquid Extracts of Coffee, which improvement is fully set forth in the following specification.

The object of this invention is to produce a liquid coffee containing properties which have never been secured in liquid coffee made in any other way.

To enable those skilled in the art to understand the nature of my invention, I make the following statement of the nature thereof.

All coffee possesses in a greater or less degree properties which give to it its flavor. The flavoring matter consists—

First, of certain volatile aromatic oils and fatty substances, which can be extracted from coffee at quite a low temperature by the process hereinafter described, but which, by reason of their volatile nature, at high temperatures evaporate.

Second, of caffeine and kindred substances, which can be extracted from the coffee-bean at a moderate temperature by the process hereinafter described. These substances are also somewhat volatile, and when heated to a high temperature are liable to be to a greater or less extent lost.

Third, of various astringent acids, known as "caffeo-tannic acid," "caffeic acid," and by other names. These acids can only be extracted from the coffee at a high temperature, and as liquid coffee is ordinarily made there is an undue predominance of the flavor of the astringent acids on account of the greater or less evaporation of the other classes of flavoring matter.

It will be obvious to any person skilled in the art that the process hereinafter described may be varied in its details without materially departing from the invention.

To retain and preserve in liquid coffee all the flavors produced by the three classes of flavoring matter hereinbefore described has not hitherto been accomplished. The volatile nature of much of the flavoring matter can be readily appreciated from the well-known fact that in a normal temperature roasted coffee which has been allowed to stand a comparatively few days loses many of its delicate properties.

By the ordinary process of making coffee much of the flavoring matter and that which gives to the coffee its greatest delicacy of flavor will pass off by evaporation. The process which I am now about to describe can be used in the treatment of the coffee-bean in its natural condition, as well as the roasted coffee-bean and the roasted and ground coffee-bean, all of which it is intended to include in the word "coffee" used alone, except when it obviously refers to the liquid.

A quantity of coffee, preferably freshly ground and freshly roasted in the ordinary way, is placed in a vessel, and a sufficient quantity of water is then added to thoroughly saturate it. As a general rule a quart of water will properly saturate a pound of coffee. The whole is kept at a temperature of about 40° Fahrenheit for three or four hours. The quantity of water that can be used to the best advantage, as well as the temperature and the length of time, will vary somewhat with different kinds of coffee and with different conditions of the coffee.

At the end of the period of saturation the mixture is placed in a cylinder, the sides of which have small perforations or openings, and the mass is subjected to a very high pressure, preferably at least two hundred thousand to six hundred thousand pounds, to separate the liquid from the coffee. The openings should be so small that the liquid alone will pass through. This pressure should preferably be continued until the liquid is entirely separated from the coffee. The liquid thus obtained should be used to saturate fresh coffee, and the operation above described can be repeated as many times as may be necessary. Obviously the manner in which and means by which this pressure is applied are immaterial. Any ordinary press capable of giving the required pressure may be used—such, for example, as the box-presses described in Letters Patent granted to Geo. B. Boomer, July 8, 1884, and numbered, respectively, 301,794 and 301,795. As such presses constitute no part of my invention, and are, moreover, fully and clearly explained in the patents above referred to, it is not thought necessary to describe them herein.

The liquid will be found to contain volatile aromatic oils and fatty substances, which serve to give delicacy and flavor to the coffee, but which, by the ordinary method of making coffee, are in part or wholly lost, by reason of their volatile nature, at high temperatures. This liquid will not contain any considerable quantity of caffeine or kindred flavoring matter or astringent acids, both of which exist in the coffee, but will not be extracted therefrom to any great extent. The coffee from which the liquid has thus been extracted is again placed in any proper vessel, saturated with fresh water, and, thus saturated, is allowed to stand for some thirty hours, the mass being kept at a temperature of about 90° Fahrenheit. The amount of water requisite for this saturation will generally be very nearly the same as that required for the first saturation; but the amount of water, as well as the temperature and the time necessary, will vary somewhat with the different kinds of coffee and the conditions of the same. The liquid is again separated from the solid by subjecting the saturated mass to a very heavy pressure, in the manner heretofore described, or in any other convenient way. This process can be repeated as often as may be desired. The product obtained will be a liquid containing a large amount of caffeine and kindred flavoring matter, which serve to give delicacy and fullness of flavor to the coffee, but which, by the ordinary methods of making coffee, are to a great extent lost, owing to their somewhat volatile nature at a high temperature. The dried coffee is again saturated with hot water, preferably at but not above boiling-point.

It is not intended that the coffee should be boiled. On the contrary, this is to be avoided, as it extracts from the coffee flavoring matters which are very disagreeable to the taste, and which will not be extracted by any of the processes described in this application. If water be taken at the boiling-point and the coffee saturated therewith, the latter would not of course be boiled, as the temperature of the water would immediately be lowered several degrees. As a general rule, about the same amount of water will be necessary as in the previous saturations. The saturated mass is allowed to stand for half an hour. The amount of water, the degree of heat, and length of time requisite will vary somewhat with different kinds of coffee and the condition thereof. The liquid is then separated from the solid by the means heretofore described, or in any other convenient way, and the operation may be repeated just as heretofore. The result will be a liquid containing astringent acids, which give to the coffee a bitter taste and form the "heavy" parts of the coffee. The three liquids obtained from the three processes aforesaid are then mixed together, and the mixture will be found to have a high degree of richness and fullness of flavor, owing to the preservation of a great proportion of the best of the flavoring matters of the coffee, as hereinbefore described.

The number of times that each of the operations aforesaid must be repeated may of course be varied. A good result is produced by repeating them until the entire mass of the three liquids obtained has the same weight as the coffee which has been worked by them, and about one-half the bulk of said coffee— that is, a pound of coffee—will produce a pint of the liquid. At this degree of concentration about three tea-spoonfuls of the liquid can be added to half a pint of water, heated preferably to about the boiling-point, and when mixed with it the mixture is in a proper condition to be taken as a beverage, and the result of the mixture will be a cup of liquid coffee of much more than the usual strength of liquid coffee used as a beverage, even when the same is carefully prepared, and containing a richness and variety of flavors resulting from the causes heretofore set forth. The liquid coffee thus highly concentrated can be placed in air-tight bottles or other proper receptacles, and the flavor of the liquid will be preserved for a very long time, and it can be used with great convenience in traveling, as well as in the household, the result being a much finer and richer and more full-flavored liquid coffee than is ordinarily obtained in the household.

Concentrated liquid coffee has heretofore been made for the most part by condensation, which involved the loss of many portions of the finest flavoring matter of the coffee, for reasons which will be obvious.

I am aware of Letters Patent No. 229,697, dated July 6, 1880, granted to David J. Gue and Joseph C. Grant. The function of the pressure in that patent was to force the water through the coffee, and by a repetition of a filtering process under pressure the flavoring matter was supposed to be extracted. By my process the flavoring matter is extracted from the coffee before any pressure is exerted, and the pressure is exerted for the purpose of separating the liquid from the solid. In that patent there is no suggestion of the necessity of a very heavy pressure, such as my process requires, nor of the three different classes of flavoring-matters and of the treatment which it is necessary to use in regard to each. As a matter of fact, the process therein described would not enable one skilled in the art to make a good liquid coffee. Other differences besides those that I have pointed out will be obvious.

The operations that I have described can be performed to the greatest advantage when large quantities of coffee are used.

Apart from the use of the three liquids flavored with different classes of flavoring-matters mixed together, they may be used separately for many purposes, or in sub-combinations of one with any one of the others. Each one of the three liquids in the concentrated form that I have described is a novel product so far as I am aware.

What I claim, and desire to secure by Letters Patent, is—

1. The method of preparing a liquid extract of coffee, by saturating the coffee first with water at a low temperature, then with water at a medium temperature, and then with water at about the boiling-point, and finally mixing together the three liquids thus obtained, substantially as described.

2. The method of treating coffee to extract the flavoring-matters therefrom, by first saturating the coffee with water at a low temperature until the aromatic oils and fatty substances are extracted, separating the liquid from the coffee, again saturating the coffee with water at a medium temperature and separating this liquid from the coffee, again saturating the coffee with water at a high temperature, but without boiling the coffee, and separating this liquid from the coffee, substantially as described.

3. The method of extracting the flavoring-matter of coffee, by saturating the same with water at a low temperature, separating the liquid from the coffee by application of a high degree of pressure, again saturating the coffee with water at a medium temperature and separating this liquid from the coffee by pressure, and again saturating the coffee with liquid at a high temperature and separating this liquid from the coffee by pressure as before, substantially as described.

In testimony whereof I have signed this specification in the presence of two subscribing witnesses.

MOSES SAMELSON.

Witnesses:
  C. F. MATHEWSON,
  JAMES F. HORAN.